Jan. 22, 1957　　　R C. JONES ET AL　　　2,778,144
FISHING LURE
Filed Dec. 19, 1955
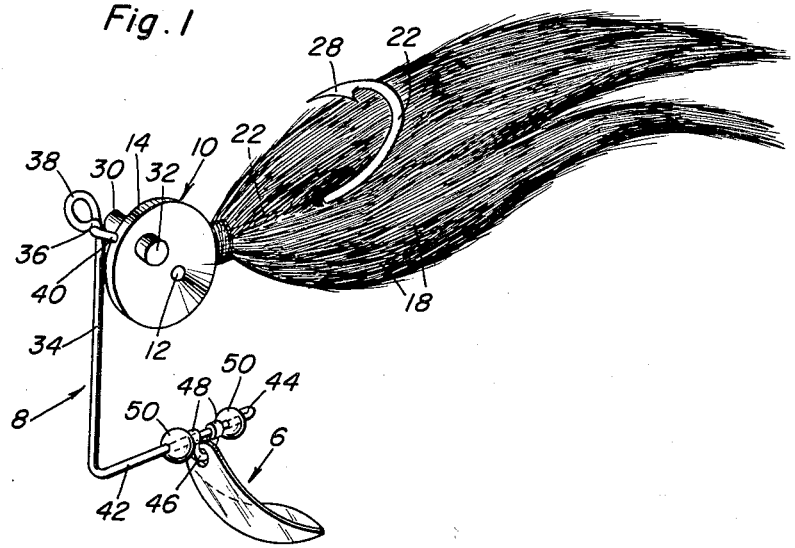
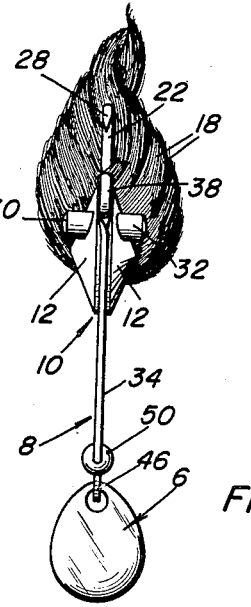
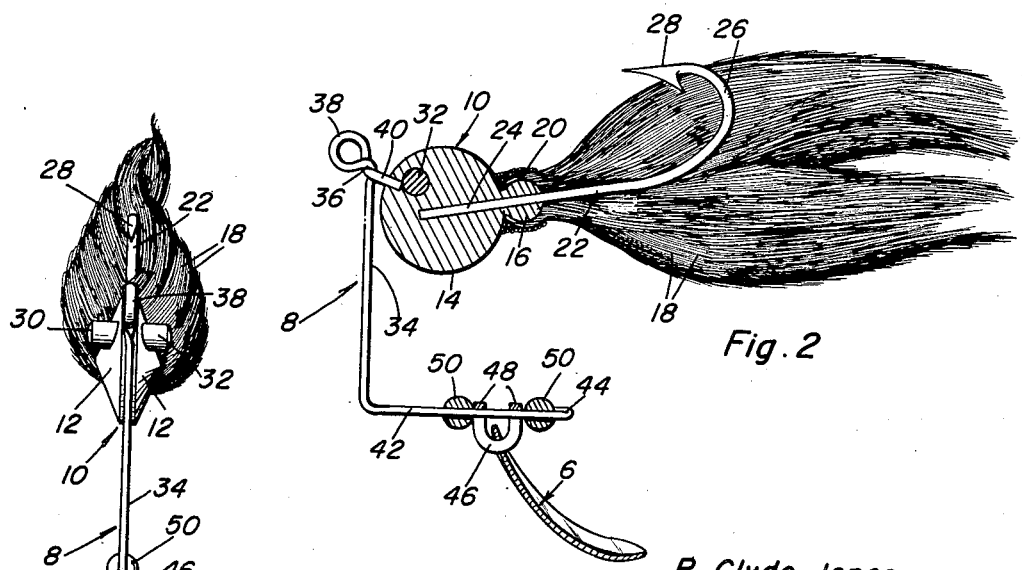
R Clyde Jones
Clayton W. Bradshaw
INVENTORS
BY *Clarence A. O'Brien*
*and Harvey B. Jackson*
Attorneys 2,778,144
FISHING LURE R Clyde Jones and Clayton W. Bradshaw, Tulsa, Okla.

Application December 19, 1955, Serial No. 553,748

3 Claims. (Cl. 43—42.11)

The present invention relates to an improved artificial fishing lure which is characterized by a combination of practical and effective components which, collectively construed, constitute a novel structural entity which serves to effectually catch fish.

Briefly the over-all construction is characterized by a peculiarly distinct bug, an attraction producing freely rotatable spinner, and a bracket which serves to hang and suspend the spinner from the head of the so-called bug.

More specifically, novelty is predicated on a length of wire or an equivalent rod which is bent upon itself to provide the desired L-shaped design, the latter embodying a long vertical limb which is attached to the head of the bug and is bent upon itself to provide a line attaching eye, the other shorter limb constituting the support for the spinner.

Other objects, features and advantages will become more readily apparent from the following description and the accompanying drawings.

In the drawings:

Figure 1 is a perspective view of the complete lure forming the subject matter of the invention;

Figure 2 is a view of the same with parts in section and elevation; and

Figure 3 is a front end elevation.

The overall composite structure is characterized by three complemental components namely the lure proper, sometimes called the bug, the spinner 6 and the connecting bracket 8 between these two parts.

The lure comprises a comparatively heavy head which is in effect a sinker and which is denoted by the numeral 10. The head is of circular form in side elevation and has oppositely disposed outstanding conical cheeks 12. The intervening portion of the head provides an annular periphery 14. On one side of the periphery 14 there is an integral ball-like radial extension 16 which facilitates the attachment thereto of the ends of the streamer elements 18. The streamers are secured to the knob-like extension 16 by means of wrappings 20. The shank 22 of the fish hook has an end portion 24 axially piercing the knob-like extension 16 and is anchored in the center of the head 10. The return bend or bight 26 of the fish hook is confined substantially in the middle of the streamers and has the usual terminal barbed hook 28. The upper forward portion of the head has a hole therethrough and there is a pin fitted and suitably anchored in this hole with the end portions 30 and 32 extending beyond the cheeks and representing eyes. Thus the "bug" comprises a weighted head attached to the leading end of the shank of a conventional-type fish hook and complemental hackle or equivalent streamer elements. It is preferred, however, that the hackle be made out of deer hairs since these stand out straight and maintain the approximate position shown even when wet.

The connecting bracket 8 is of general L-shaped form and is formed from a length of rod-stock or heavy wire of an appropriate gauge or cross-section. The long vertical arm 34 has its upper end portion bent upon itself and twisted as at 36 to define a line eye 38. The terminal end 40 is embedded in the peripheral portion of the head in the manner shown in Fig. 2. The horizontal limb or arm 42 has its terminal bent upon itself to provide a shoulder 44 and this serves to hold in place the U-shaped clevis 46, that is the eye portions 48 which surround the limb 42. The numerals 50 designate assembling and end thrust beads or the like which are also mounted on the limb and cooperate with the clevis. The clevis carries the spoon-type spinner 6.

Our improved bait is attractive and is designed to deceptively lure victim fish thereto in an obvious manner. The L-shaped bracket 8 is attached to the head so that the limb or arm 42 underlies the head and this arrangement places the spinner beneath the head portion of the bug or lure proper.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An artificial bait comprising a circular relatively heavy head having oppositely projecting substantially conical cheek portions, said head embodying an annular peripheral edge portion, the latter having a radial outstanding knob-like extension, a fish hook having a shank extending through said extension and embedded in said head, hackle members attached by wrappings to said extension and cooperating with the shank of said hook, said head being provided with an aperture, and a pin having an intermediate portion secured in said aperture and end portions projecting beyond the opposite cheek portions and constituting artificial eyes.

2. An artificial bait comprising a circular relatively heavy head having oppositely projecting substantially conical cheek portions, said head embodying an annular peripheral edge portion, the latter having a radial outstanding knob-like extension, a fish hook having a shank extending through said extension and embedded in said head, hackle members attached by wrappings to said extension and cooperating with the shank of said hook, said head being provided with an aperture, a pin having an intermediate portion secured in said aperture and end portions projecting beyond the opposite cheek portions and constituting artificial eyes, and an L-shaped bracket having vertical and horizontal arms, said vertical arm having a line eye and an end portion attached to the peripheral portion of said head.

3. An artificial bait comprising a circular relatively heavy head having oppositely projecting substantially conical cheek portions, said head embodying an annular peripheral edge portion, the latter having a radial outstanding knob-like extension, a fish hook having a shank extending through said extension and embedded in said head, hackle members attached by wrappings to said extension and cooperating with the shank of said hook, said head being provided with an aperture, a pin having an intermediate portion secured in said aperture and end portions projecting beyond the opposite cheek portions and constituting artificial eyes, an L-shaped bracket having vertical and horizontal arms, said vertical arm having a line eye and an end portion attached to the peripheral portion of said head, and a clevis carried by said horizontal arm, said clevis being provided with a spinner.

References Cited in the file of this patent

UNITED STATES PATENTS

| D. 169,303 | Dawson | Apr. 14, 1953 |
| 2,111,020 | Arbogast | Mar. 15, 1938 |
| 2,167,945 | Gilliam | Aug. 1, 1939 |
| 2,261,433 | Demory | Nov. 4, 1941 |